United States Patent Office 3,483,910
Patented Dec. 16, 1969

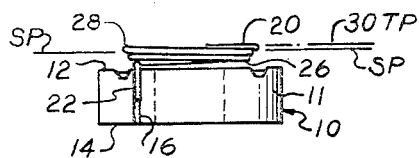
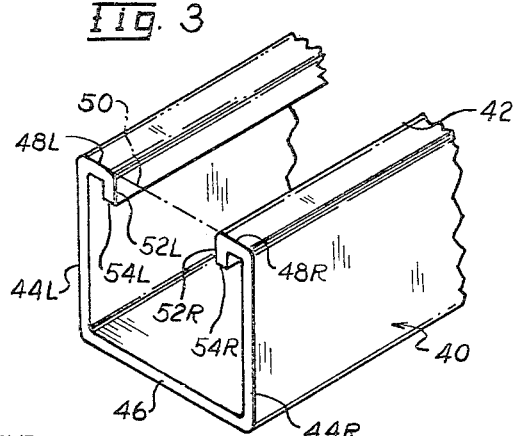
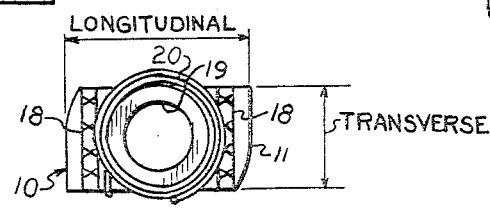
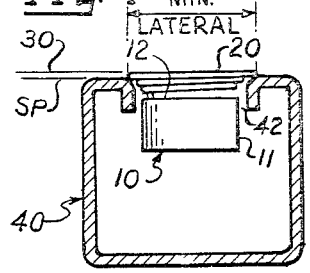
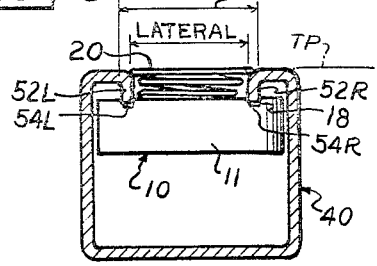
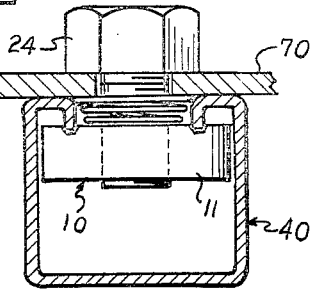
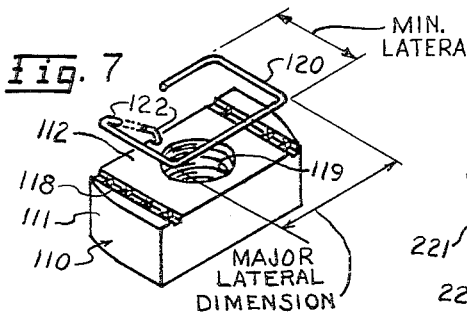
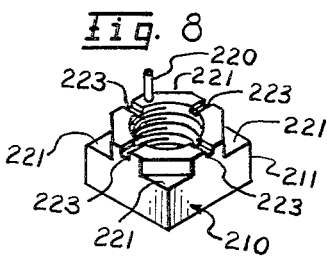
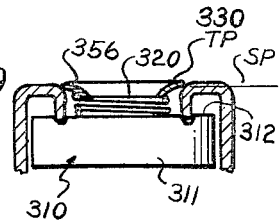
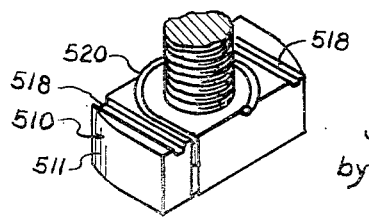

3,483,910
ATTACHMENT DEVICES INCLUDING EXTEND
WORKING MEANS, FOR APERTURED STRUC-
TURAL MEMBERS
Carl Henry LaLonde and James Howard Van Huffel,
Warren, Ohio, assignors to The Youngstown Sheet and
Tube Company, Mahoning, Ohio, a corporation of
Ohio
Filed Apr. 1, 1968, Ser. No. 717,880
Int. Cl. F16b 39/00
U.S. Cl. 151—41.75                          12 Claims

ABSTRACT OF THE DISCLOSURE

An attachment device (first) including pressure responsive extensible means adapted to maintain said device bearing against a structural support member to facilitate mating with a complementary attachment device (second). Preferably, the first attachment device comprises a nut having a tension spring secured thereto for resiliently urging the nut against the internally turned flanges of a channel member having a generally U-shaped cross section to facilitate mating with a bolt member; the combination permitting a substantial interior portion of the channel to be clear for use as a raceway for wires and the like.

BACKGROUND OF THE INVENTION

This invention generally relates to attachment devices, such as nuts and bolts, in combination with apertured structural members and for securing thereto other devices or structural elements.

The improved attachment device of this invention is particularly adapted for use in connection with structural channel elements which have a generally U-shaped cross section with inwardly turned flanges, which flanges define bearing seats for supporting relatively heavy loads. These structural elements may be employed as struts, which are sometimes cast in concrete; they may also be used as columns, cross members, etc. in the construction of storage racks and the like; or they may form simple support members for hanging other elements. Sometimes, it is desirable to employ these channels additionally as raceways or conduits for threaded wires and the like.

Prior art attachment devices, adapted for use with slotted structural elements and to facilitate the threading of a complementary fastening member, are exemplified by the disclosure in U.S. Patent 2,696,139 to C. W. Attwood. There is disclosed a nut having a pair of serrated grooves, in what may be termed an obverse side of the nut. On a reverse side of the nut is mounted a compression or press-working spring. When the attachment device is inserted in a channel member, the spring seats on the bottom of the channel and urges the nut into engagement with the inwardly turned flanges of the channel member. Consequently, with each different depth channel a correspondingly different length of spring is required. Such devices are also susceptible to tilting, and subsequent falling out of place into the channel, when pressure is applied to the obverse side or face of the nut by means of a misaligned bolt. Since the spring seats on the bottom of the channel, the spring and nut necessarily occupy the full depth of the channel. This deters the use of the channels as raceways for wires and the like.

OBJECTS AND SUMMARY OF THE INVENTION

It is an object of this invention to provide an improved attachment device including a first fastening member to facilitate securing with a second and complementary fastening member, when used in connection with an apertured structural member.

It is another object of this invention to provide an improved attachment device which is adapted for use with channel members of any depth.

A further object of this invention is to provide an attachment device which does not occupy the full depth of a channel member, thus adapting the channel member for use both as a structural support member and a raceway.

A still further object of this invention is to provide the combination of a slotted channel member with an attachment device in an arrangement wherein dislodgement by a misaligned complementary attachment member, or other force, is deterred.

Briefly, the objects are attained by providing an attachment device for combination with an apertured channel, which device embodies: a first fastening device, such as a bolt or nut, adapted to receive a complementary and mating second fastening device; seating means forming a seat for engagement with an obverse and exterior side of the channel; and extensible tension working means on an obverse side of the first fastening device. The seating means may be formed by a portion of said extensible tension working means. Preferably, the attachment device comprises an elongated nut having a pair of grooves in its obverse side and on opposing sides of and transverse to a threaded aperture of the nut; most preferably, a conical type spiral tension spring forms the extensible tension working means and has its small diameter end of the truncated cone adjacent to the obverse side of the nut; and one of the larger spirals, preferably the topmost, of the spring forms on its bottom side the seat adapted for engagement with an obverse side of a slotted channel.

DESCRIPTION OF THE DRAWING

The invention will be more fully understood and further objects and advantages thereof will become apparent when reference is made to the following detailed description and to the accompanying drawing, in which:

FIG. 1 is an elevational view of a preferred embodiment of an attachment device (female type) of this invention;

FIG. 2 is a plan view of the attachment device shown in FIG. 1;

FIG. 3 is an isometric view of a fragment of a channel structural member of the type for which the attachment device of this invention is particularly adapted;

FIG. 4 is an elevational view of the attachment device of this invention, in preindexed and unextended position, in combination with a channel structural member;

FIG. 5 is a view similar to FIG. 4 but with the attachment device in indexed and extended position;

FIG. 6 is a view similar to FIG. 5 but with a complementary male member and a plate attached;

FIGS. 7 and 8 are isometric views of alternate forms of female attachment members of this invention;

FIG. 9 is a cross-sectional view of a further alternate form of this invention; and FIG. 10 is an isometric view of a male type attachment member of this invention.

DESCRIPTION OF PREFERRED EMBODIMENTS

Referring to FIG. 1, the preferred embodiment of attachment member 10 herein shown comprises a nut 11, having an obverse face 12 and a reverse face 14, and a spring 20 positioned on said obverse side 12. The obverse face being the one which will be open to view when the nut is in installed position. The spring 20 is suitably secured to the nut 11, such as by extending and wedging a leg 22 into groove 16 of nut 11.

The nut 11 is preferably of the elongated type, i.e., it is longer in a first direction (longitudinal) than in a second direction (transverse). The nut 11 also preferably has positioning means in the form of a pair of serrated parallel slots 18, which are preferably transverse to said longitudinal extent and in laterally spaced relation with the threaded opening 19, which opening is adapted to receive the threaded portion of a complementary bolt member 24.

The spring 20 is of the extend-working type (tension), as opposed to the press-working type (compression). The preferred form, as illustrated, is of the conical spiral type with the small diameter end 26 of the truncated cone being adjacent to the obverse face 12 and the relatively longer diameter end 28 of the truncated cone being spaced from said obverse face but forming the obverse plane 30 of the spring 20.

The attachment member 10 of this invention is particularly adapted for insertion in the continuous slot 42 of a structural element or channel 40, as shown in FIG. 3, and for supporting relatively heavy loads. The channel 40 is shown to have a U-shaped cross-sectional configuration. For purposes of description, the mutually opposing vertical portions 44R and 44L may be termed the legs 44 of the U, and the interconnecting web 46 may be termed the base. Flange portions 48R and 48L extend inwardly from legs 44R and 44L, respectively, and define therebetween the slotted opening 42 into which the member 10 is inserted. The flanges 48R and 48L also form the obverse side 50 of the structural element 40, and have respective lip portions 52R and 52L extending therefrom, interiorly of the element 40. The terminals of lip portions 52 provide landings or bearing surfaces 54R and 54L for receiving the attachment member 10. Preferably, these landings are received by the slots or grooves 18 of the nut 11, when the nut is in indexed or home position.

As may be seen in FIG. 4, the attachment member 10 is freely inserted, reverse side first, between the lip portions 52 and with the longitudinal extent of the nut 10 corresponding to the longitudinal extent of the opening 42 until one or more of the upper turns of the spring 42 engage the flange portions 48 in overlying contact fashion. Preferably, the bottom side of the top spiral of the spring forms a seating plane SP. Pressure is applied to the nut 10 to further urge it, against the tension of the spring 42, interiorly of the channel 40 and then rotated 90°. Upon release of the pressure, the nut 11 moves in a reverse direction until the serrations of the grooves 18 establish contact with the landings 54. In this indexed or installed position, which may be observed in FIG. 5, the spring 20 is under tension and is therefore constantly urging the nut 11 into seating and frictional contact with the landings 54, which contact deters sliding of the nut 10 during further assembly. The establishment of frictional contact is of particular significance when the channel member 40 is positioned vertically so that attachment device will not slide due to its own weight.

It should be noted that with the combination of the attachment device of this invention with a channel member, any initial misalignment of the complementary attachment device (the bolt) with the nut will not cause the nut to be tilted out of position, such as when the end of the bolt establishes "offside" contact with the obverse face of the nut. With the arrangement of this invention, if such offside contact is made, the nut 11 will tilt but the tilting action will not dislodge the spring 20. Upon withdrawal of the bolt member, the nut 11 will automatically spring back into position. In contrast, in those arrangements wherein a press-working spring is employed to back up a nut, the nut functions as a bearing plate for the spring and any offset force will not only tilt both the nut and spring but will contribute to their dislodgment.

Since the attachment device of this invention does not rely upon "bottoming" on the base or bottom side of the channel, springs of the same length may be employed with attachment members used in connection with channels of varying depths. In contrast, those arrangements which bottom on the channel require compression springs of different lengths for each different depth of channel.

It will be understood that although the preferred embodiment of this invention involves a conical spiral type tension spring, the invention may take other forms which involve an extend working member for holding the primary attachment member in taut engagement with the bearing surfaces adjacent the aperture of a structural element, through which aperture extends the male member of a pair of complementary attachment members.

It is to be noted in FIG. 7, as well as in all of the other disclosed alternate embodiments, that corresponding parts have corresponding numerals in respect to the last two digits, i.e., the parts in the embodiment of FIG. 1 bear reference numbers below one hundred, the parts in FIG. 7 have reference numbers in the 100 series, the parts in FIG. 8 bear numbers in the 200 series, etc.

An alternate, but less preferred, embodiment of this invention is illustrated in FIG. 7. The nut 111 therein shown has a spring 120 on the obverse face 112 thereof. For the purpose of clarity, the spring 120 is shown in a position slightly removed from normal in respect to the obverse side 112 of nut 111. The spring 120 is generally rectangular in shape with a leg 122 being of sufficient length and resiliency to provide the necessary tensional force for maintaining taut engagement of the nut 111 with the seating surface of a channel member.

"As with the conical spring in the preferred embodiment, the attachment member nut 111 is freely inserted in the same fashion, reverse side first, until the minimum lateral extent portions of the rectangular shape spring 120 engage the flange portions of the channel in overlying contact fashion. After pressure is applied to the nut 111 to urge it interiorly of the channel, the nut 111 is rotated 90° so that the major lateral dimension overlies the flange portions of the channel."

FIG. 8 discloses an alternate form of attachment device 210. Fastening member, nut 211, has a generally square configuration but with the upper portions of the corners of the square removed so as to provide landings 221 for engagement with landings 54 of a channel member when the nut 211 is in indexed position. There is also disclosed slots 223 in the obverse face 212 adapted to receive a turning tool, such as a screwdriver, to facilitate the indexing of the nut 211. The spring 220 may be of the conical type such as disclosed in FIG. 1 or of the rectangular type shown in FIG. 7. It will be understood that slots of the type 223 may also be employed in connection with other embodiments of fastening members of this invention.

FIG. 9 discloses another alternate form of attachment member 310 of this invention. Nut 311 has on its obverse side 312 a spring 320 attached to a ferrule member 356. The ferrule member 356 defines the top plane TP of the attachment member 310. The bottom side of the flared portion of ferrule 356 defines the seating plane SP of the attachment device 310. Otherwise, the embodiment therein disclosed corresponds generally to that shown in FIG. 1.

FIG. 10 discloses a male type attachment device, designated as 510, comprising a fastening member 511 in the form of a T-bolt and a fragment of a spring 520 which is preferably of the conical spiral type. The head of the bolt 511 may incorporate slots 518.

It will be understood that any of the other extend working means shown in connection with a nut member may also be employed with a bolt or male member to form an embodiment, though less preferred for some installations, of this invention.

In all of the embodiments, it is preferred to so dimension the extend working means so that the top plane TP of such means is flush with the top plane of the flanges 48 of channel member 40, when such extend working means is in the indexed position, i.e., providing the extend working means with a lateral dimension (in case of a conical spring, the diameter of the top spiral) slightly greater than the width of the channel slot but less than the sum of the channel slot plus the radii of curvature of the interiorly turned flange portions. Such arrangement is desirable so as not to interfere with the seating of a member to be attached, such as plate 70 shown in FIG. 6.

What is claimed is:

1. An attachment device, having an obverse terminal plane, and comprising:
   (a) a fastening member having an obverse side;
   (b) seating means formed by a flared ferrule defining a seating plane intermediate of said obverse side and said obverse terminal plane;
   (c) extend working means on said obverse side and joining, in spaced relation, said seating means and said fastening member; and
   (d) said extend working means being adapted, when stretched, to maintain said seating means and said obverse side in taut engagement with corresponding landings of a support structure.

2. An attachment device as described in claim 3, wherein:
   (a) said fastening member is a threadable nut having a pair of spaced apart grooves on said face on opposing sides of the threaded aperture of said nut.

3. An attachment device, comprising:
   (a) a fastening member having
      (1) a threaded portion,
      (2) a longitudinal extent dimension transverse to the axis of the threads of said portion,
      (3) a transverse extent dimension transverse to said axis and to said longitudinal extent dimension, said transverse extent dimension being less than said longitudinal extent dimension,
   (b) a conical type extend working spring having
      (1) its minimum diameter adjacent to a face of said fastening member
      (2) its maximum diameter in spaced relation with said face, said maximum diameter being less than said longiturinal dimension but greater than said transverse dimension.

4. An amendment device as described in claim 3, having:
   seating means defined by the underside of a top spiral portion of said spring.

5. An attachment device as described in claim 3 wherein:
   (a) said fastening member is in the form of a bolt.

6. An attachment device as described in claim 3 wherein:
   (a) said fastening member is in the form of a nut having a slot extending through said obverse side, said slot being adapted to facilitate the index positioning of said nut.

7. An attachment device, as described in claim 3, which further comprises:
   (a) lateral positioning means on said face adapted to position said member when installed between the flanges of an element defining a slotted opening.

8. In combination with a channel structural element having a generally U-shaped configuration with the legs of the U being interiorly turned to define flange portions having lip portions terminating in landings with slot therebetween, a threaded nut for locking engagement with said element, which nut includes:
   (a) an obverse side engaging said landings;
   (b) lateral positioning means on said obverse side laterally positioning said nut between said flanges of said element; and
   (c) extend working retention means, on said obverse side of said nut, and having retention portions in spaced relation with said obverse side and in overlying contact with said flanges, said retention means resiliently uring said nut into engagement with said landings;
   (d) said nut having a maximum dimension, transverse to the axis of its threads, greater than the width of said slot;
   (e) said nut having a minimum dimension, transverse to the axis of its threads, less than the width of said slot;
   (f) said retention portions having a minimum lateral dimension greater than the width of said slot.

9. In combination with a channel structural element having a generally U-shaped cross-sectional configuration, the legs of the U being inwardly turned to provide flange portions with a slot defined therebetween, an attachment device comprising:
   (a) a fastening member having
      (1) an obverse side and a reverse side,
      (2) threads,
      (3) a longitudinal dimension, transverse to the axis of said threads, greater than the width of said slot,
      (4) a tranverse dimension, transverse to said axis and to said longitudinal dimension, less than the width of said slot,
      (5) said reverse side facing the base of the U;
   (b) seating means defining a seating plane; and
   (c) extend working means
      (1) on said obverse side,
      (2) having a portion spaced from said obverse side, said portion having a minimum lateral dimension, extending in the same direction as the transverse dimension of said member, greater than the width of said slot, thereby providing overlying contact with said flanges when said member is inserted between said flanges into said element.

10. The combination as described in claim 9, wherein:
    (a) said lips are interiorly upturned and form radii portions at the turns;
    (b) said extend working means has a lateral dimension slightly greater than the width of said slot but less than the sum of said width of said slot plus the radii of said flange portions on said obyerse side of said channel.

11. The combination as described in claim 10, wherein:
    said extend working means is a conical spring with a relatively small diameter portion being adjacent said obverse face of said member and a relatively larger diameter portion forming a seating plane with said radii portions of said flanges of said channel element.

12. An attachment device having an obverse terminal plane, and comprising:
    (a) a fastening member having an obverse side and being in the form of a generally square nut having upper portions thereof removed at the corners of the square so as to form landings at said corners adapted to seat on the flange portions of a support structure;
    (b) seating means defining a seating plane intermediate of said obverse side and obverse terminal plane; and
    (c) extend working means on said obverse side and joining, in spaced relation, said seating means and said fastening member.

References Cited

UNITED STATES PATENTS

| 1,306,100 | 6/1919 | Chadwick. | |
| 2,345,650 | 4/1944 | Attwood | 85—32 |
| 2,940,558 | 6/1960 | Schlveton | 85—5 |

FOREIGN PATENTS

| 1,061,149 | 3/1967 | Great Britain. |
| 1,494,307 | 7/1967 | France. |
| 513,368 | 11/1939 | Great Britain. |
| 1,175,966 | 11/1958 | France. |

EDWARD C. ALLEN, Primary Examiner